United States Patent [19]

Mak

[11] Patent Number: 4,919,950

[45] Date of Patent: Apr. 24, 1990

[54] COMPUTER CONTROLLED, FULLY AUTOMATIC, SHORT-ORDER WOK COOKING SYSTEM FOR PREPARING STIR-FRIED CHINESE FOOD

[75] Inventor: Stephen M. Mak, Los Angeles, Calif.

[73] Assignee: Larry B. Harvey, Los Angeles, Calif.

[21] Appl. No.: 224,740

[22] Filed: Jul. 27, 1988

[51] Int. Cl.$^5$ ............................ A23L 1/01; A47J 27/00
[52] U.S. Cl. ........................................ 426/233; 99/348;
  99/357; 99/443 R; 99/486; 426/523
[58] Field of Search ........................ 426/231, 233, 523;
  99/326, 348, 357, 443 R, 486; 134/76, 115

[56] References Cited

U.S. PATENT DOCUMENTS

| | | | |
|---|---|---|---|
| 3,859,644 | 1/1975 | Main | 426/233 |
| 4,700,617 | 10/1987 | Lee et al. | 99/348 |
| 4,748,902 | 6/1988 | Maurantonio | 99/357 |

Primary Examiner—George Yeung
Attorney, Agent, or Firm—Beehler & Pavitt

[57] ABSTRACT

A computer controlled, fully automatic wok cooking system prepares stir-fried, Chinese dishes according to arbitrarily selected customer orders entered at a point-of-sale computer. The computer integrates the operation of the conveyer, cooking, dispensing, and point of sale entry devices according the order, menu and ingredients, A conveyor belt including a plurality of woks draws the woks through a plurality of cooking stations. Each station is provided with a burner or heating element and a dispensing station controlled by the computer according to the customer enterd order. Oil or condiments are added at a first station by a corresponding plurality of dispensers and at subsequent cooking stations the food ingredients are either stirred or additional spices, food ingredients and condiments added by corresponding dispensers. At the last cooking station, additional food ingredients, such a vegetables, nuts or other ingredients requiring shorter cooking times, are added and cooking is completed. The completed short order stir-fried dish is then delivered to a serving container at a delivery station. The emptied wok is advanced by the conveyor system through a plurality of cleaning stations, where the wok is inverted, washed, scoured, rinsed and dried. The cleaned and dried wok is then returned by the conveyor system to the initial cooking station to begin the cooking process again according to the then appropriate customer order.

18 Claims, 6 Drawing Sheets

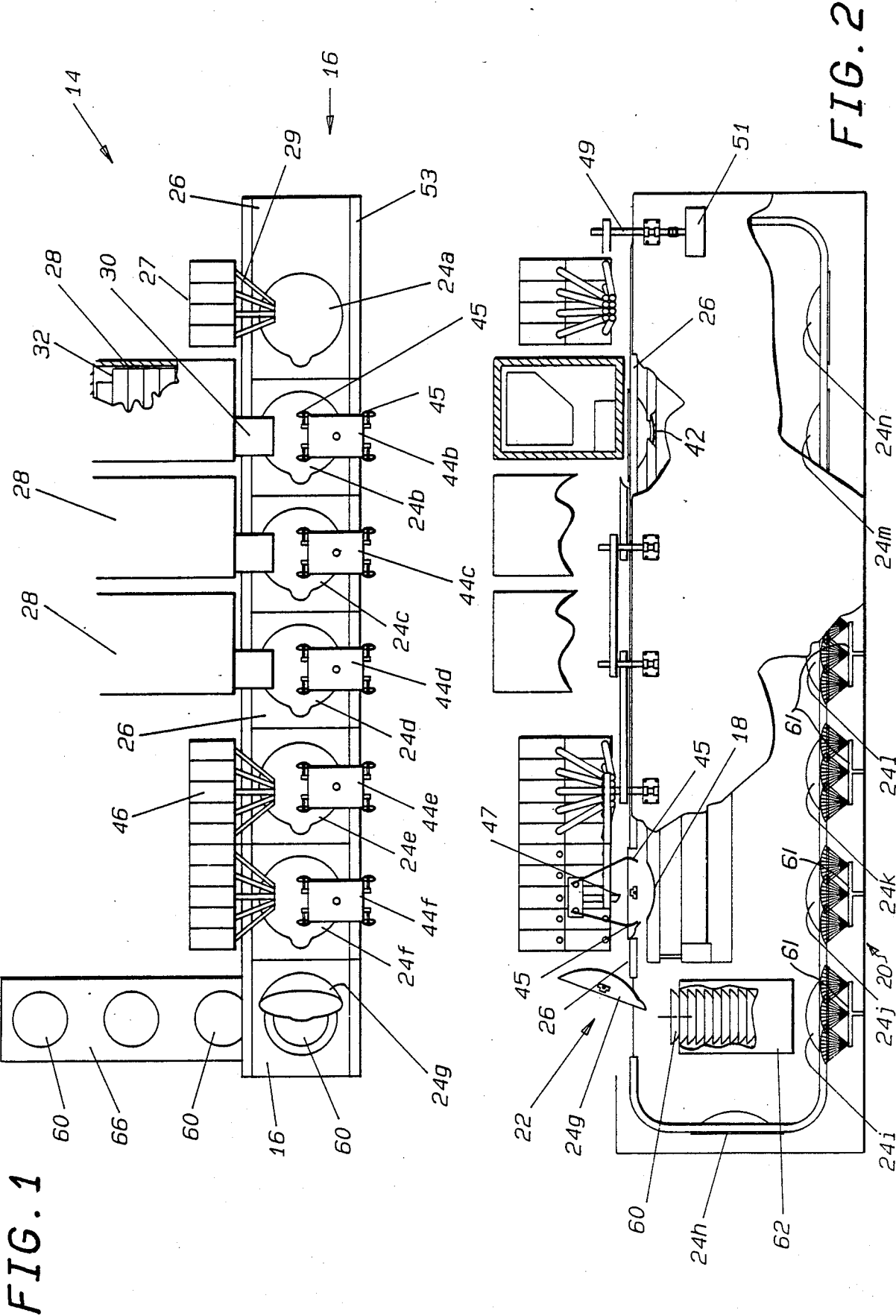

COMPUTER CONTROLLED, FULLY AUTOMATIC, SHORT-ORDER WOK COOKING SYSTEM FOR PREPARING STIR-FRIED CHINESE FOOD

BACKGROUND OF THE INVENTION

1. Field of the Invention

The present invention relates to the field of automated restaurant cooking methods and apparatus, and in particular to a conveyor-belt, computer controlled system for providing short order stir-fried meals.

2. Description of the Prior Art

Automatic food processing equipment which utilizes conveyor systems are well known. Typically, such mass production food-processing equipment is used for producing a single type of food item. See, for example, BORSUK, "Method and Apparatus for Continuously Cooking Loaf Meat", U.S. Pat. No. 4,801,564 (1978); LATHAM et al., "Omelet Preparing Machine and Process", U.S. Pat. No. 3,782,169 (1974); LEE, "Fortune Cookie Machine", U.S. Pat. No. 4,339,993 (2982); DIENER et al., "Automatic Food Cooking Machine", U.S. Pat. No. 4,548,130 (1985); KANAGI, "Apparatus for Automatically Cooking Products Made of Batter, Such as Pancakes", U.S. Pat. No. 4,583,451 (1986); SUGIMURA, "Process for Continuous Rice Cooking by Steaming and Apparatus Therefor", U.S. Pat. No. 4,571,342 (1986); and ZEITLIN, "Automatic Turnover Machines", U.S. Pat. No. 2,855,867 (1958).

Even in automated conveyor food-processing systems which utilize computer control, the computer controlled mechanism is utilized for process monitoring of the manufacture of a single type of foodstuff. See, for example BULLERCOLTHURST, "Multi-Conveyor Processing System", U.S. Pat. No. 4,610,886 (1986) and U.S. Pat. No. 4,644,857 (1987).

Prior art devices which are capable of delivering several different types of food do so only in connection with minimal processing of an otherwise completely prepared, instant-food item, such as by adding hot water to a dehydrated food package, as shown in HARASHIMA, "Food Vending Machine with Cooking Apparatus", U.S. Pat. No. 4,030,632 (1977); and RUBINO, "Vending Machine with Fast Cooking Means", U.S. Pat. No. 3,534,676 (1970).

Such apparatus and methods, which provide for mass production of food items allowing some control or variation of the foodstuff, is largely limited to adding mixtures of flavor enhancers to a single type of foodstuff such as shown by BUCKHOLZ et al., "Mixed Seasoning", U.S. Pat. No. 4,514,094 (1985) or allows for some type of a customized cooking operation of a standardized foodstuff without any ability to substantially change or arbitrarily compose the recipe such as shown in RULLMAN, "Apparatus for Processing Food", U.S. Pat. No. 3,702,583 (1972) or BARTFIELD, "Apparatus for Dispensing Individual Orders of a Hot Food Product and Components Usable Therewith", U.S. Pat. No. 4,438,683 (1984).

What each of these prior art devices fails to show, either alone or in combination, is a methodology which can be performed in an automated food processing or cooking system for the control of a multiplicity of arbitrarily chosen, individualized cooking operations, such as temperatures, cooking times, stirring, addition of ingredients and the like on a dish-by-dish basis according to arbitrary customer order selection or short order.

Therefore, what is needed is a methodology and apparatus which can provide for automated fast food cooking of arbitrarily selected short orders.

BRIEF SUMMARY OF THE INVENTION

The invention is an apparatus for fully automatic cooking of short order meals comprising a plurality of cooking containers, and a conveyor for advancing the plurality of cooking containers along a predetermined path. A heating mechanism or burner heats the plurality of cooking containers as the cooking containers are advanced along the predetermined path by the conveyor. A food dispensing mechanism selectively dispenses a selected amount of selected food to a selected one of the cooking containers at a selected point on the predetermined path. A stirring mechanism stirs food ingredients within selected ones of the cooking containers at selected points on the predetermined path. A computer control mechanism is coupled to the conveyor, heating mechanism, food dispensing mechanism and stirring mechanism for controlling operation of each of the mechanisms according to an arbitrarily selected customer order which is selectively assigned to each one of the cooking containers as each cooking container is advanced along the predetermined path.

As a result, cooked meals are automatically prepared according to a short order selection entered through the computer control mechanism.

In the preferred embodiment the cooking containers are woks. The food dispensing mechanism comprises spice/condiment dispensing mechanisms for selectively providing at least one spice/condiment among a plurality of spice/condiments and a food ingredient mechanism for selectively providing at least one type of food ingredient.

The computer control mechanism comprises a point-of-sale entry mechanism for entering an arbitrarily selected customer order, and a computer for generating a sequence of timed control signals corresponding to each the arbitrarily selected customer orders. A controller mechanism generates drive signals for the conveyor, heating mechanism, food dispensing mechanism, and stirring mechanism to execute the sequence of timed control signals corresponding to the arbitrarily selected customer order.

The heating mechanism comprises a plurality of separate heating elements. Each element is separately controlled by the computer control mechanism to provide a selected degree of heat for a corresponding selective period of time.

The apparatus further comprises a mechanism for removing the food ingredients from each of the plurality of cooking containers after the corresponding food ingredients have been completely prepared, and a cleaning mechanism for cleaning each of the plurality of cooking containers after the food ingredients have been removed from each corresponding cooking container.

The cleaning mechanism comprises washing mechanism for washing each cooking container with a washing solution. A scouring mechanism scours each cooking container. A rinsing mechanism rinses each cooking container, and a drying mechanism dries each cooking container as the plurality of cooking containers are advanced along the predetermined path.

The invention is also a method for automatically preparing arbitrarily selected, short order meals comprising the steps of disposing food ingredients into a cooking container according to arbitrary customer selection. The food ingredients are disposed into the cooking container by a food dispensing mechanism controlled by a computer control mechanism into which the customer selection is entered. The selected food ingredients are advanced on a conveyor system through a plurality of subsequent cooking stations. Food ingredients are selectively disposed into the container at preselected ones of the plurality of cooking stations. The food ingredients are then selectively manipulated in the cooking container at selected ones of the cooking stations according to the customer order entry as controlled by the computer controlled mechanism. The heating and timing of the food ingredients within the cooking container are selectively controlled at each of the plurality of cooking stations. The food ingredients within the cooking container are delivered when the ingredients are completely prepared according to the arbitrarily entered customer order.

As a result, short orders originated by customers are prepared in a fully automated method.

The method further comprises performing the steps of selectively advancing the food container, selectively disposing food ingredients therein, selectively manipulating the food ingredients therein, selectively heating the food ingredients therein and delivering the food ingredients in a plurality of cooking containers. Each of the cooking containers is advanced on a conveyor system among the plurality of cooking stations. The steps are simultaneously performed in corresponding order to the position of the cooking container within the plurality of cooking stations according to the significance attached to each cooking station by the customer entered short order.

The method further comprises the steps of cleaning the cooking container and returning the cooking container for reuse for a subsequent customer short order. The method comprises the steps of cleaning the plurality of cooking containers at predetermined stations within the conveyor path and returning each of the cleaned cooking containers in sequence for reuse in a plurality of subsequent customer short order entries.

The invention includes an improvement in an apparatus for automatically cooking a plurality of arbitrarily separately selected short order meals. The apparatus comprises a spice/condiment dispensing mechanism for selectively dispensing one of a plurality of spice/condiments.

The invention and its various embodiments may be better visualized by now turning to the following drawings wherein like elements are referenced by like numerals.

BRIEF DESCRIPTION OF THE DRAWINGS

FIG. 1 is a diagrammatic top plan and partially cutaway view of a conveyor system devised according to the invention.

FIG. 2 is a diagrammatic cutaway side view of the system as shown in FIG. 1.

The invention and its various embodiments may be better understood by now turning to the following detailed description.

DETAILED DESCRIPTION OF THE PREFERRED EMBODIMENTS

The present system is an apparatus and a method for computer controlled, fully automatic, short-order wok cooking which is typically used to prepare stir-fried foods, commonly utilized in oriental or Chinese cuisine.

A computer controlled, fully automatic wok cooking system prepares stir-fried, Chinese dishes according to arbitrarily selected customer orders entered at a point-of-sale computer. The compter integrates the operation of the conveyer, cooking, dispensing, and point of sale entry devices according the order, menu and ingredients. A conveyor belt including a plurality of woks draws the woks through a plurality of cooking stations. Each station is provided with a burner or heating element and a dispensing station controlled by the computer according to the customer entered order. Oil or condiments are added at a first station by a corresponding plurality of dispensers and at subsequent cooking stations the food ingredients are either stirred or additional spices, food ingredients and condiments added by corresponding dispensers. At the last cooking station, additional food ingredients, such a vegetables, nuts or other ingredients requiring shorter cooking times, are added and cooking is completed. The completed short order stir-fried dish is then delivered to a serving container at a delivery station. The emptied wok is advanced by the conveyor system through a plurality of cleaning stations, where the wok is inverted, washed, scoured, rinsed and dried. The cleaned and dried wok is then returned by the conveyor system to the initial cooking station to begin the cooking process again according to the then appropriate customer order.

Figure 5:
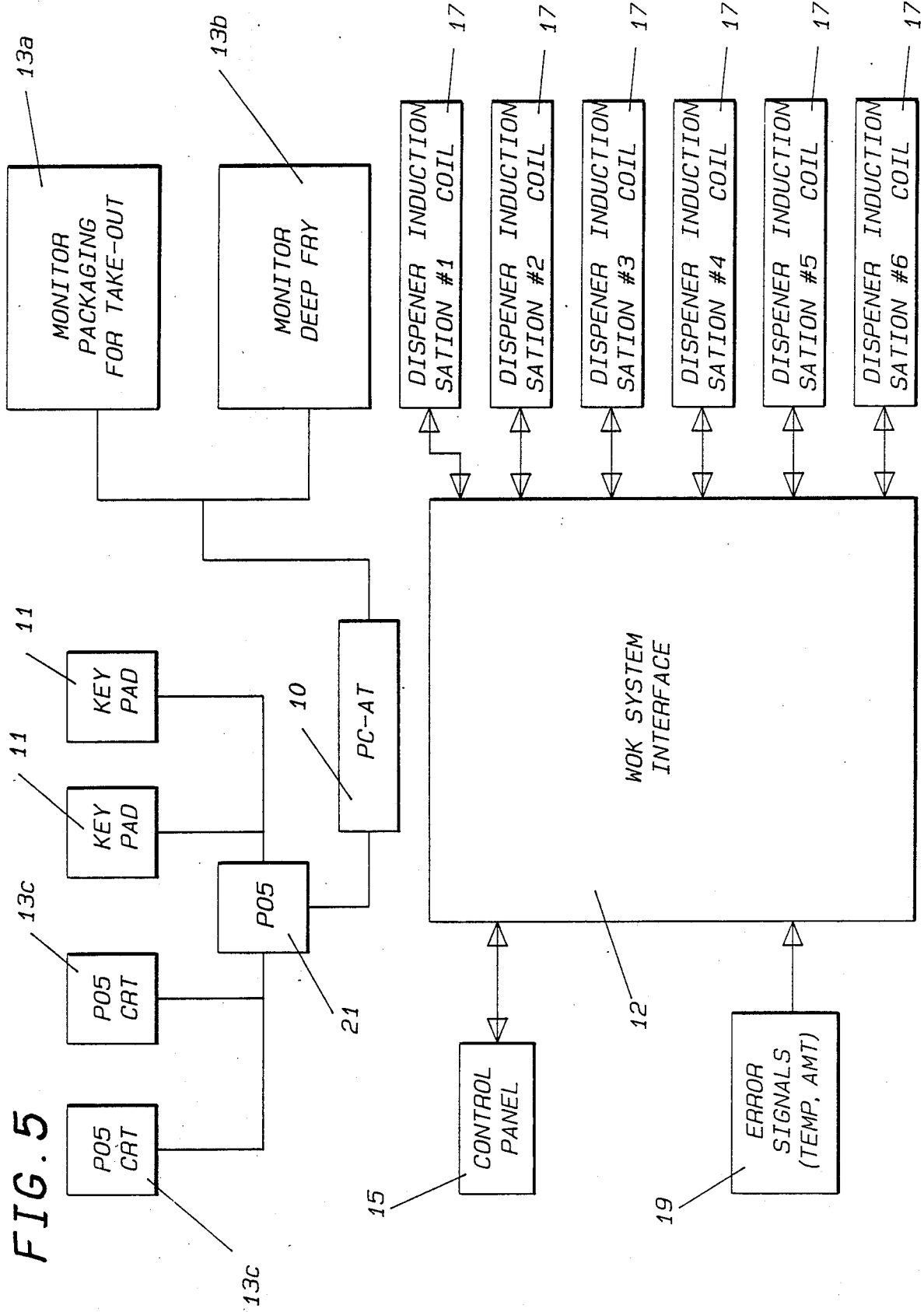
FIG. 5 is a simplified block diagram of the information and control circuitry utilized in combination with the present invention.

As best depicted in FIG. 5, the system comprises a point-of-sales computer, generally denoted by reference numeral 10, which is placed at the customer counter or other appropriate location where the customer's order is taken and logged into computer 10 by keyboards 11 or other equivalent means and displayed in a corresponding CRT displays 13a–c. CRT display 13a is a monitor which may be viewed from the customer and packaging station reserved in the restaurant for takeout service, while monitor 13b is positioned at a deep fat frying station in the food preparation area. Monitors 13c are viewable by the customer, who can track the preparation of his meal on the monitor or view other advertising and promotional messages thereon. The conveyor system of FIGS. 1–3 prepares automated stir-fried foods, while deep fat fried foods are prepared manually at a separate station, not shown, in a conventional manner.

The internal architecture and circuitry of computer 10 is conventional, e.g. a IBM PC-AT or compatible, is not further relevant to the invention and is therefore not discussed below except where illustrative.

One of the output devices driven by computer 10 is a interface circuit 12 which receives the digital output signals from computer 10 or other appropriate control signals and converts those signals into appropriate control signals or drive signals coupled to operational devices at each of the stations in the cooking system. Interface 12 is comprised of digital decoders which generate command signals for a plurality of drivers or buffers which in turn provide the control or driving signal to various electrical or electromechanical means within the system as described below. Also included in interface 12 are analog-to-digital converters which receive and provide feedback signals from the system to computer 10 for closed loop control of various parameters of the cooking system such as temperature, dispensed amounts, inventory checking, error signals and the like. Details of portions of the circuitry in interface 12 are shown and described in greater detail in FIGS. 6 and 7. For example, interface 12 is bidirectionally coupled to a control panel 15 which allows for manual pushbutton or switched inputs from the food preparers. Information is bidirectionally communicated to a plurality of station food dispensers, symbolically referenced by numeral 17 in FIG. 5. Interface 12 also communicates bidirectionally with a plurality of wok heating elements, symbolically denoted by reference numeral 19 in FIG. 5. However, before describing the electronic control of the entire system, first consider the conveyor system wherein the cooking operation is performed.

The conveyor cooking system, generally denoted by reference numeral 14 in FIG. 1, further comprises a conveyor belt unit, generally denoted by reference numeral 16, controllable heater units, generally denoted by reference numeral 18, a washing subsystem generally denoted by reference numeral 20, and a delivery counter 22. Conveyor 16 comprises typically twelve to sixteen woks which are connected sequentially on a closed-loop conveyor drive. The woks are bowl- or dish-shaped and each wok 24 is carried on a metallic belt 26 above heaters 18. The length of conveyor belt 16 is divided into a plurality of stations with each station having an operative element positioned at the station. For example, an oil, condiment and spice dispensing unit 27 is provided at a first preheat station as shown in FIG. 1 in connection with wok 24a. Dispensing unit 27 may be used to selectively dispense:

vegetable oil in 0.2, 0.4 and 0.6 oz units;
salt in 0.05 oz units;
dried red chilies in 0.1 oz units;
crushed Szechuan peppercorns in 0.05 oz units;
star anise in 0.05 oz units;
minced garlic in 0.1, 0.2, and 0.5 oz units;
minced ginger in 0.1, 0.2, and 0.5 oz units; and
orange peel in 0.8 oz units.

The selection and delivery amounts of ingredients is illustrative only and may be changed as desired. Thus ingredient listings may be arbitrarily modified within the teachings of the invention without departing from its scope.

Wok 24a is preheated by a corresponding heater unit 18a which heaters in the preferred embodiment are electrical induction heaters capable of directly heating each wok 24 to stir-fry temperatures within a few seconds. A predetermined measurement of oil, condiments and spices is added from a conventional liquid/solid dispensing unit 27 and directed through dispensing tube 29 into wok 24a in the first preheat station.

A food or meat ingredient dispenser 28 is provided at a second station at which wok 24b is depicted. Dispenser 28 is comprised of a horizontal conveyor belt 30 having a plurality of bins 32 configured in its interior. Each bin is funneled or directed toward belt 30 which terminates or turns above wok 24b. Alternatively, many types of solid chunk or liquid delivery dispensers are known to the art and any one of them may be used in conveyor system 14. In the illustrated embodiment, dispenser 28 selectively delivers:

whole egg in 1.8 and 2.5 oz units;
lo mein noodles in 6 and 8 oz units;
nest of noodles in 2.5 oz units;
fried rice base in 8 oz units; or
chicken broth in 0.4 and 8 oz units.

The food listed above, typically prepared, are loaded within horizontal bins 32 for dispensation onto conveyor belt 30. Each bin 32 is provided with a separate movable piston, feed screw, or other motive means (not shown) which is controlled by interface 12 in response to commands from computer 10. Dispenser 28 is a conventional food dispenser capable of delivering predetermined amounts of solid or liquid food elements. In any case, each bin 32 is selectively indexed to produce a quantity of food products. Ultimately a measured amount of the food ingredient is delivered from its respective bin 32 onto belt 30 into waiting wok 24b at the second station of the system 14.

Each station, except for the first preheating station shown as occupied by wok 24a in the illustrated embodiment, is subject to mechanical stirring by a corresponding stirrer 44b-f. In other embodiments the first station may also have a stirrer 44 associated therewith. Each stirrer 44 is centered on station with a rotatable drive shaft 47 as shown in side view in FIG. 2. Shafts 47 are each coupled through a chain of pulleys and belts with adjacent stirring mechanisms 44. Ultimately, the stirrer at the first station, corresponding to wok 24b as shown in FIG. 1, is coupled to a drive shaft 49 through a belt and pulley combination. Shaft 49 in turn is driven by a torquer 51 which provides the motive force to turn each of the stirring mechanisms 44 by 180 degrees. For example, as shown in FIG. 1, each stirring mechanism has a first and second pair of stirring tools 45. When the first pair of tools 45 is positioned along the center line and in a wok at the corresponding station, the second pair of stirring tools is positioned on the opposing side of stirring mechanism 44 and are is disposed in a washing trough 53. Washing trough 53, which extends from the side of belt system 16 may be either a trough of running water. Thus, after one pair of stirring tools 45 has been utilized, each stirring mechanism 44 is rotated so that the just-used pair of tools 45 are disposed within washing trough 53. Food particles, spices and other ingredients which may adhere to stirring tools 45 are thus washed from the tool so as to prevent food or flavor mixing or contamination with the next adjacent wok moved into the corresponding station, which next wok could typically be provided with an entirely different constituent recipe and ingredients.

The upper portion of each stirring mechanism includes an electromechanical drive (not shown) which reciprocates stirring tools 45 to simulate the tossing and mixing action of hand held spatulas. In addition, each stirring mechanism is capable of a predetermined amount of vertical movement along the line of its corresponding shaft 47 so that stirring tools 45 can be lifted out of the interior of the corresponding wok to permit rotation of stirring mechanisms 44 by 180 degrees and then relowered both to lower the new cleansed pair of stirring tools 45 into the corresponding wok and to lower the just-used pair of stirring tools 45 into washing trough 53. The mechanism for vertically lifting the upper portion or head of stirring mechanism 44 to vertically dispose stirring tools 45 into and out of washing trough 53 or into and out of the corresponding wok and to reciprocate spatula tools 45 are conventional and will not be further described.

Each wok, such as wok 24b for example, is positioned above a heater 42 which is also individually controlled by interface 12. Typically, heater 42 is a conventional electric induction heater with the power to it controlled through an electromechanically driven control element. Power to the induction heaters is varied by appropriate solid state SCRs control, control of duty cycle or other means. Therefore, each wok 24a-g is provided with a selected degree of heat for a selected period of time according to the type of food product which has been selectively dispensed from the corresponding dispenser into the wok.

After a predetermined amount of initial cooking at the second station, wok 24b then moves to the third station which is depicted in FIGS. 1-2 as occupied by wok 24c. Wok 24c has a corresponding heater (not shown) which is similarly connected to and controlled by interface 12 in response to computer 10. The corresponding dispenser at the third station selectively delivers;

a stir-fry vegetable mix in 2, 4 and 9 oz units;
a mu shu vegetable mix in 2 and 4 oz units;
broccoli flowerettes in 7 and 9 oz units;
1½ inch green onion pieces in 1.5 and 2.5 oz units;
sliced waterchestnuts in 1.5 and 3 oz units;
chinese snow peas in 1.5 and 2 oz units;
straw mushrooms in 3 oz units; or
red bell peppers in 1.5 oz units.

The food ingredients added at the third station continue to cook in a selective manner at the third station and are stirred to insure even cooking. The amount of heat applied to the wok at each station is separately controlled at each station and may vary over time at each station.

The third station is followed by one or more additional stations at which additional condiments, food ingredients or stirring functions may be added or performed. In the illustrated embodiment a fourth, fifth and sixth station are provided as depicted in FIG. 1 corresponding to woks 24d through 24f with each with a corresponding dispenser 28, heater 18 and stirring mechanism 44 similar to that described in connection with the second station corresponding to wok 24b.

For example, at the fourth station the following food ingredients are selectively delivered:
egg whites in 1 oz units;
peas and carrots in 1 and 2 oz units;
cubed chicken in 2, 3, 4, 5, and 8 oz units;
sliced beef in 2, 3, 5, 6, 7, and 8 oz units;
shrimp in 2, 3, 5, 6, and 8 oz units;
BBQ pork strips in 2 and 3 oz units;
shredded chicken in 2 oz units; or
Szechuan meat sauce in 6 oz units.

Following the fourth station is a fifth and sixth station depicted by the position of woks 24e and f. Wok 24e and f are also provided with corresponding heaters 42e and f controlled through interface 12 by computer 10. Similarly, the fifth and sixth stations are each provided with a stirring means 44e and f as previously described. However, the fifth and sixth stations have in addition thereto, a spice, sauce or condiment dispenser 46. These are typically solid paste, granulated or liquid food ingredients and are dispensed in selected controllable amounts by means well known to the art.

For example, at the fifth station the following food ingredients are selectively delivered:
soy sauce in 0.4 oz units;
lo mein/chow mein sauce in 4 and 8 oz units;
mu shu sauce in 0.3 oz units;
kung pao sauce in 3 oz units;
garlic sauce 3 oz units; or
orange beef sauce 12 oz units.

At the sixth station the following food ingredients are selectively delivered:
sesame seed oil (spray) in 0.1 and 0.2 oz units;
cornstarch mix in 0.2, 0.4, 0.8, 1 and 1.5 oz units;
peanuts in 1.5 oz units;
cashews in 1 oz units;
almonds in 1 oz units;
rice vinegar 0.2 oz units;
chopped green onions in 0.4 oz units; or
chili oil (spray) in 0.3 oz units.

The final cooking step is then performed with all of the ingredients and spices being stirred together at the last station in the illustrated embodiment. The conveyor belt 16 again advances forwardly and the prepared meal is delivered from the wok, illustrated in FIGS. 1-3 by wok 24g which is tipped either by inclination of the conveyor belt or preferrably by a tipping mechanism provided specially to incline wok 24g with respect to the vertical causing its contents to be delivered to a plate 60 placed at the delivery position at the end of conveyor belt 16.

Figure 4A:
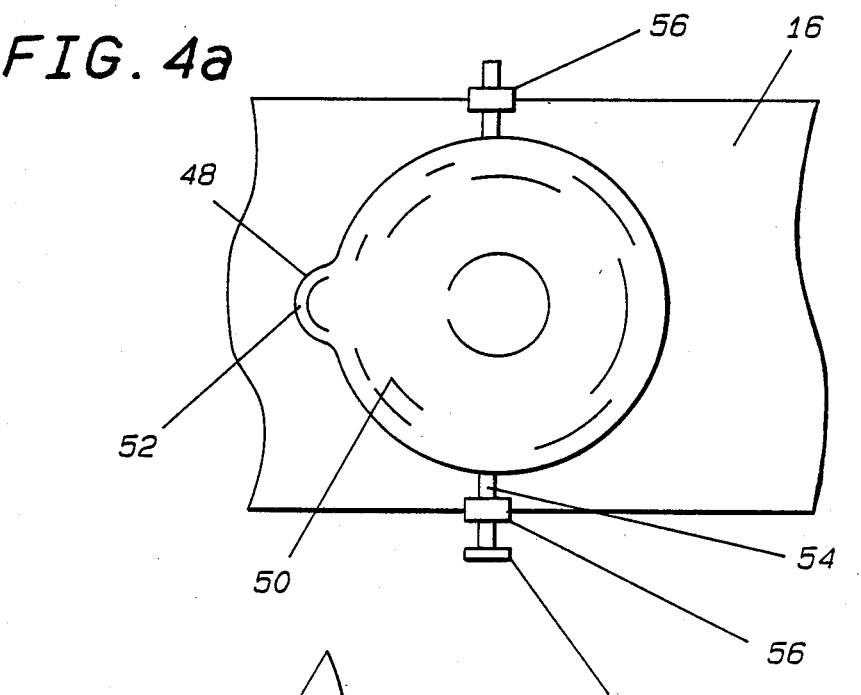
FIG. 4a is a highly simplified plan view of a wok in the delivery position of the system of FIGS. 1–3 before it is tilted for food delivery.
Figure 4B:
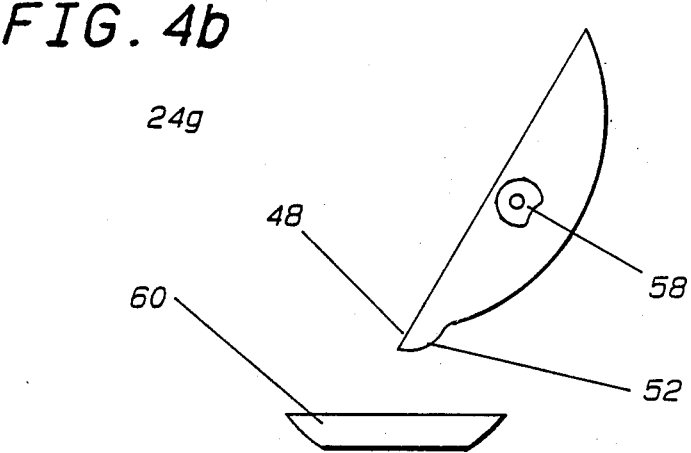
FIG. 4b is a highly simplified side view of the wok of FIG. 4a in the delivery position of the system of FIGS. 1–3 after it is tilted for food delivery.

FIGS. 4a and b illustrate the wok in the final or delivery position assumed by wok 24g in FIG. 1. As depicted in the top plan view of FIG. 4a, wok 24g is shaped to include a spout portion 48 along its forward edge 50 which includes a circumferential lip portion 52 designed as a pour spout at a lower level than the remaining portions of the wok. Wok 24g, and in fact each of the woks, is coupled to belt 16 by means of a pivot bar 54. Pivot bar 54 in turn is journaled within a pivot block 56 attached to belt 16. When the wok reaches the position of wok 24g in FIG. 1, a cam member 58 attached to pivot bar 54 reaches a cam or eccentric (not shown) mounted by the side of belt 16 at the selected position to tip wok 24g as best depicted in side view in FIG. 4b. The prepared meal within wok 24g is then displaced and delivered to a waiting dish 60 placed in the delivery position by means of a conventional dish elevator 62 in which a plurality of dishes 60 are stored pending use.

Figure 3:
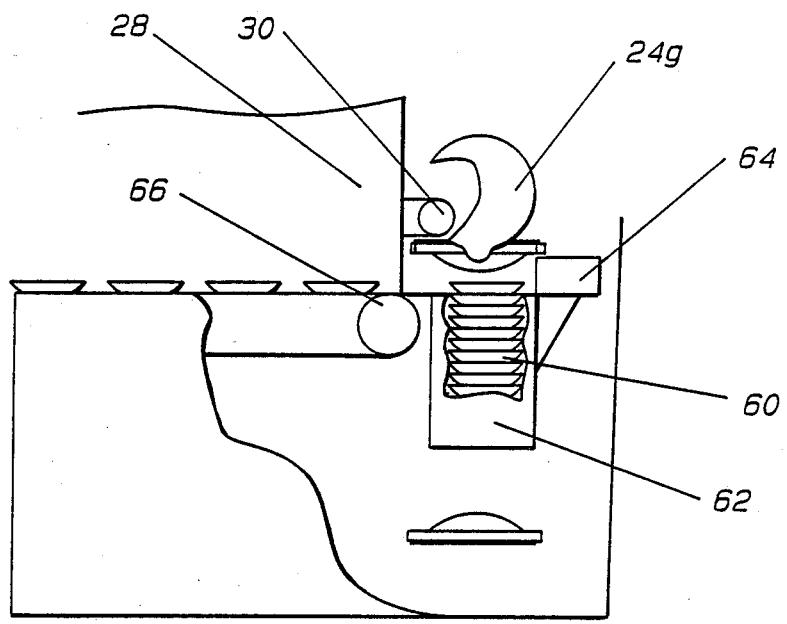
FIG. 3 is a diagrammatic cutaway end view of the system of FIGS. 1 and 2.

As best seen in the side cutaway view of FIG. 3, a dish advancing mechanism 64 controlled by computer 10 and interface interface 12 then advances dish 60 at the appropriate time, namely after delivery of the food contents of wok 24g, by moving a plunger or carrier against the side of dish 60, taking it from the top of dish elevator 62 and delivering it to a selectively controlled dish conveyor 66. Dish conveyor 66 then advances the dish with the delivered meal to a serving position wherein the dish is removed and delivered to the customer.

The prepared meal is now cooked, seasoned and stirred and ready for consumption.

It is included within the scope of the invention an an additional mechanism may be included for removing the contents of wok 24g. Such a mechanism could include a scraper or spatula conformed to fit the shape of wok 24g which would rotate it like a paddle forcing the contents of the wok onto plate 60.

After the wok is emptied, the continued indexing conveyor belt 16 brings the wok to the underside of the conveyor belt as best depicted in FIG. 2. Ultimately, the wok will be inverted and drawn through an automated washing sequence as depicted by the positions of woks 24i-m in FIG. 2. In the first position depicted by wok 24i, the wok is subjected in the inverted position to a spray of hot water and soap ejected from a spraying means 61 onto the interior surface of wok 24i. Thereafter, the wok is moved forward and is subjected to a scraping or cleaning action by scrubber means (not shown) which either directs a powerful blast of air/steam into the inverted inside surface of wok 24j or otherwise provides a mechanical scraper or scouring pad which is utilized to remove any adhering particles of food not dislodged by the spray of the first station.

Thereafter, the woks are further indexed and subjected to a rinsing spray of clean water or steam provided by spraying means (not shown). The washed, scraped and rinsed wok is then advanced to the next station wherein its interior surface is dried by a blast of forced air from a fan (not shown). Water and debris from the washing mechanism is collected in a wash pan and removed through a drain. Steam which is generated by water being evaporated against the heated woks is similarly removed by a conventional exhaust hood and ducted to an outside exhaust port (not shown).

Thereafter, the cleaned and dried woks are returned by the conveyor belt indexing mechanism to the first station as described above to be recycled with the next order.

Consider once again the architecture of the electronic system as depicted in FIG. 5 for the control of the conveyor system 14 depicted in FIGS. 1-4. Each of these six dispenser stations described above includes separately controllable dispensers and heating induction coils, collectively denoted as dispenser station modules 17. The control of these modules is better understood by turning now to the symbolic block diagram of a dispenser station and control module as depicted in FIG. 6 and an error signal module as symbolically depicted in the block diagram of FIG. 7, both of which modules comprise part of interface 12.

Figure 6:
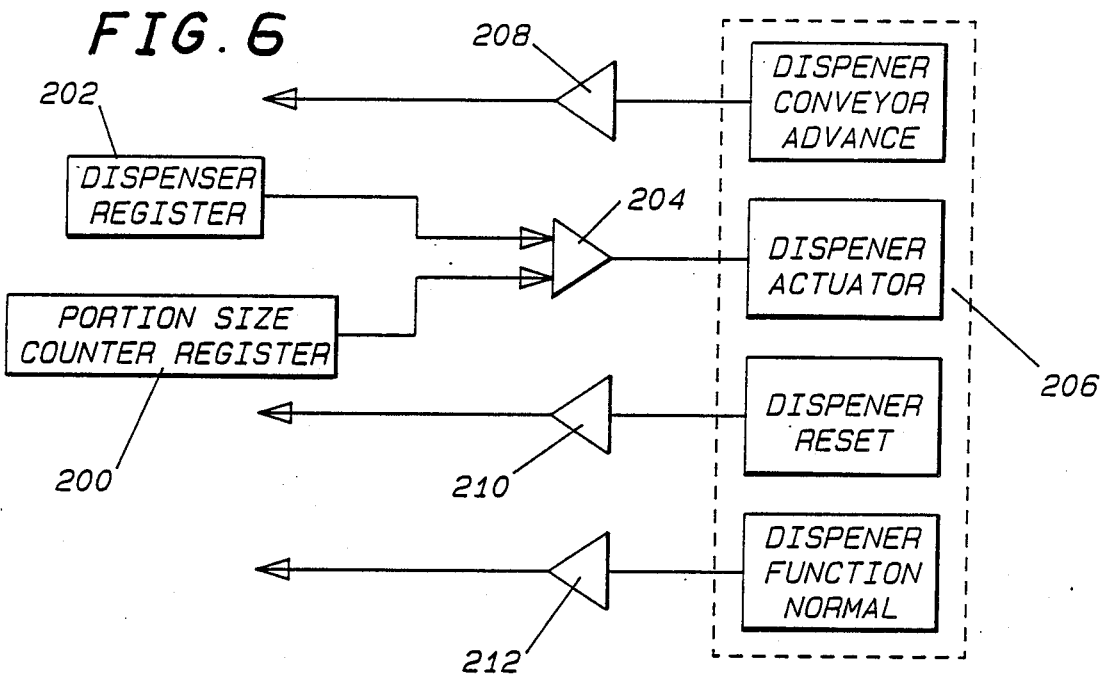
FIG. 6 is a simplified block diagram of the information and control circuitry utilized in the interface unit of FIG. 5 in relation to the food dispensing units.

In FIG. 6 a register, symbolically denoted by register block 200, contains the portion size or the number of units of a portion of a food ingredient which is to be selectively delivered at the station. Each of the six dispenser stations 17 incorporates at least one station control module as depicted in FIG. 6. The module also includes a dispenser register 202 which is an addressable unit identifying which of the dispenser sub-units within the station are to be selectively activated. None, one, or any number of the dispenser sub-units at a station may be simultaneously activated to deliver the selected number of units of the food ingredient at the station. The numbers stored within dispenser register 202 and portion size counter register 200 are coupled to logic within a device driver 204 which responsively generates an on/off signal to the electromechanical unit that causes the food ingredient to actually be delivered and a signal which controls the length of activation or other means by which the portion of food which is to be delivered is controlled. The output of device driver 204 is thus communicated to the electromagnetic dispensing actuator, symbolically denoted by reference numeral 206 in FIG. 6.

Feedback signals are also generated within the dispensing unit which are communicated back through the dispenser station control module. For example, a signal indicative of advance or indexing of a delivery conveyor within the dispenser is provided through a buffer circuit 208. Similarly, a dispenser reset signal is provided through a buffer 210 and a dispenser function normal signal is provided to buffer 212. By this means the status or condition of the dispenser actuator 206 can be monitored and appropriately timed through interface unit 12 subject to program control. As many dispenser station control modules as depicted in FIG. 6 will be included within each station as there are separately controllable food ingredients to be delivered.

Figure 7:
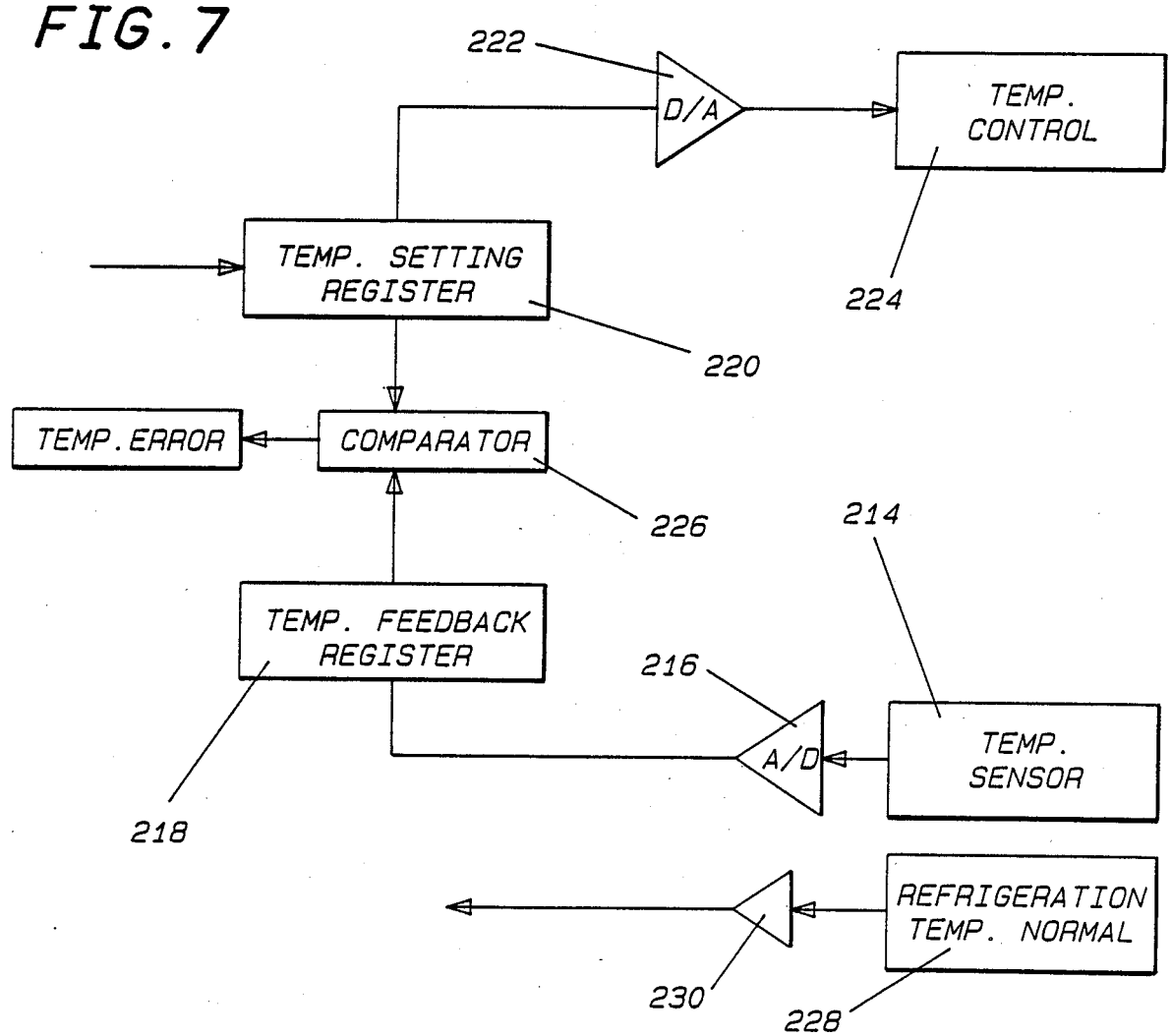
FIG. 7 is a simplified block diagram of the information and control circuitry utilized in the interface unit of FIG. 5 in relation to the temperature control setting and sensing units in the wok subsystem.

FIG. 7 is a symbolic diagram depicting one embodiment of the error reporting signals within circuit block 19 of FIG. 5. The temperature of the wok as heated by the induction heater at each station is monitored by a temperature sensor 214. The analog output of temperature sensor 214 is then converted by an analog-to-digital converter 216 and stored within a temperature feedback register 218. Meanwhile, the programmably controlled temperature setting for the induction heater at the station has been loaded within a temperature setting register 220. The contents of register 220 are converted in a digital-to-analog converter 222 provided as an analog drive control signal to a temperature control unit 224 within the induction heater at the station. The temperature which is actually achieved is thus sensed by temperature sensor 214 and ultimately presented in digital form in temperature feedback register 218. The contents of temperature setting register 220 and temperature feedback register 218 are then each coupled to a comparator 226. If the degree of difference between the contents of registers 218 and 220 exceeds a predetermined threshold, comparator 226 generates a temperature error signal or alternatively simply transmits the actual temperature difference to interface 12 and thence to computer 10 wherein an appropriate control response is made.

In addition to control of the heating temperature at each station, many dispensers will require refrigeration since the dispensers will contain perishable food ingredients which might be degraded by temperature and time. Therefore, a refrigeration temperature sensor 228 is provided within the refrigerated portion of each dispenser at each station and buffered through buffer 230 for communication to interface 12. Again, the refrigeration temperature is monitored by computer 10 through interface 12 to insure that the perishable food ingredients are kept within predetermined temperatures as required by appropriate health and sanitation considerations. Thus, each one of the six stations as depicted in FIGS. 1 and 2 will incorporate an error signal circuit 19 as described in connection with FIG. 7.

Figure 8:
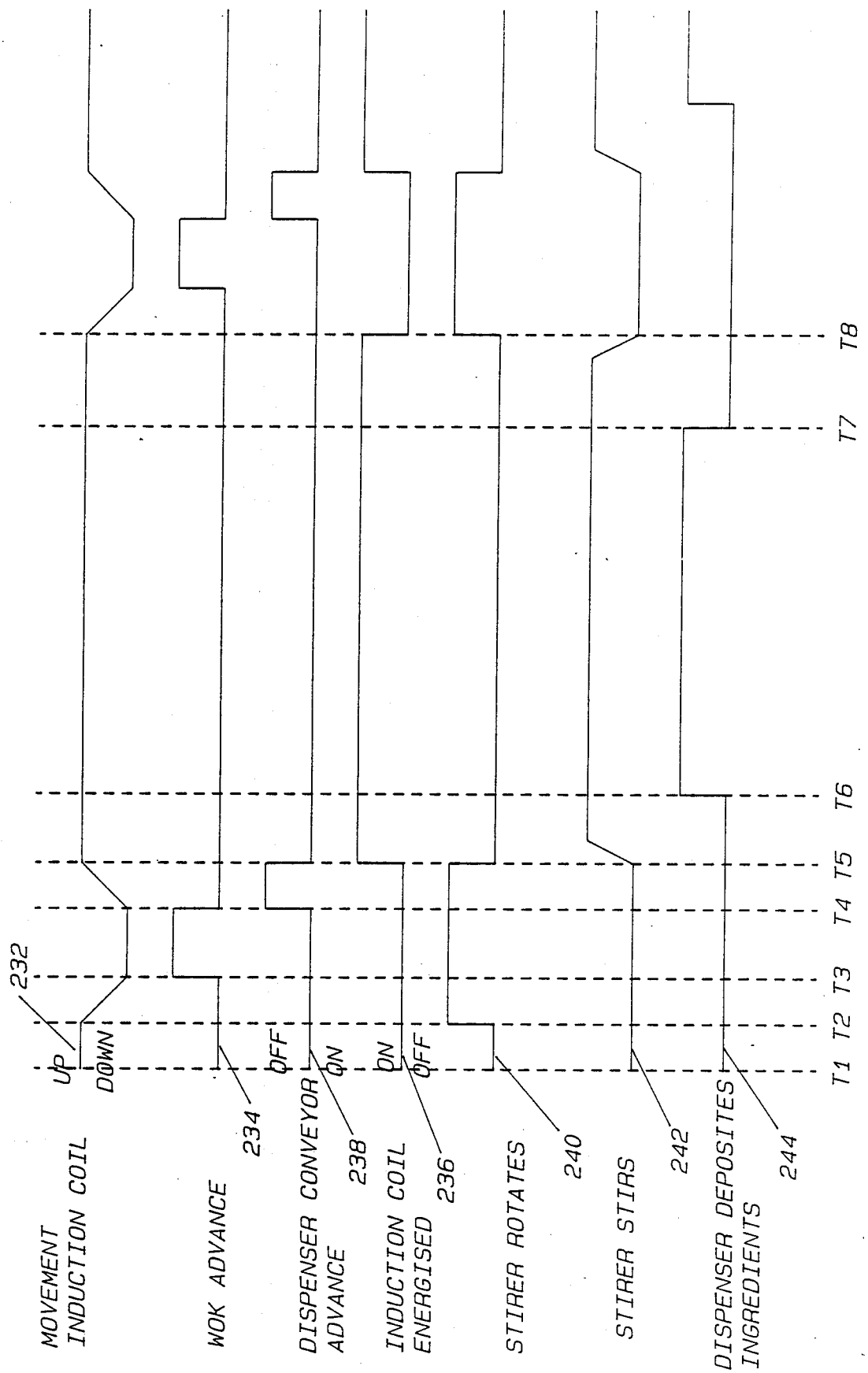
FIG. 8 is a timing diagram depicting the methodology used in the wok subsystem of the illustrated embodiment.
Figure 9:
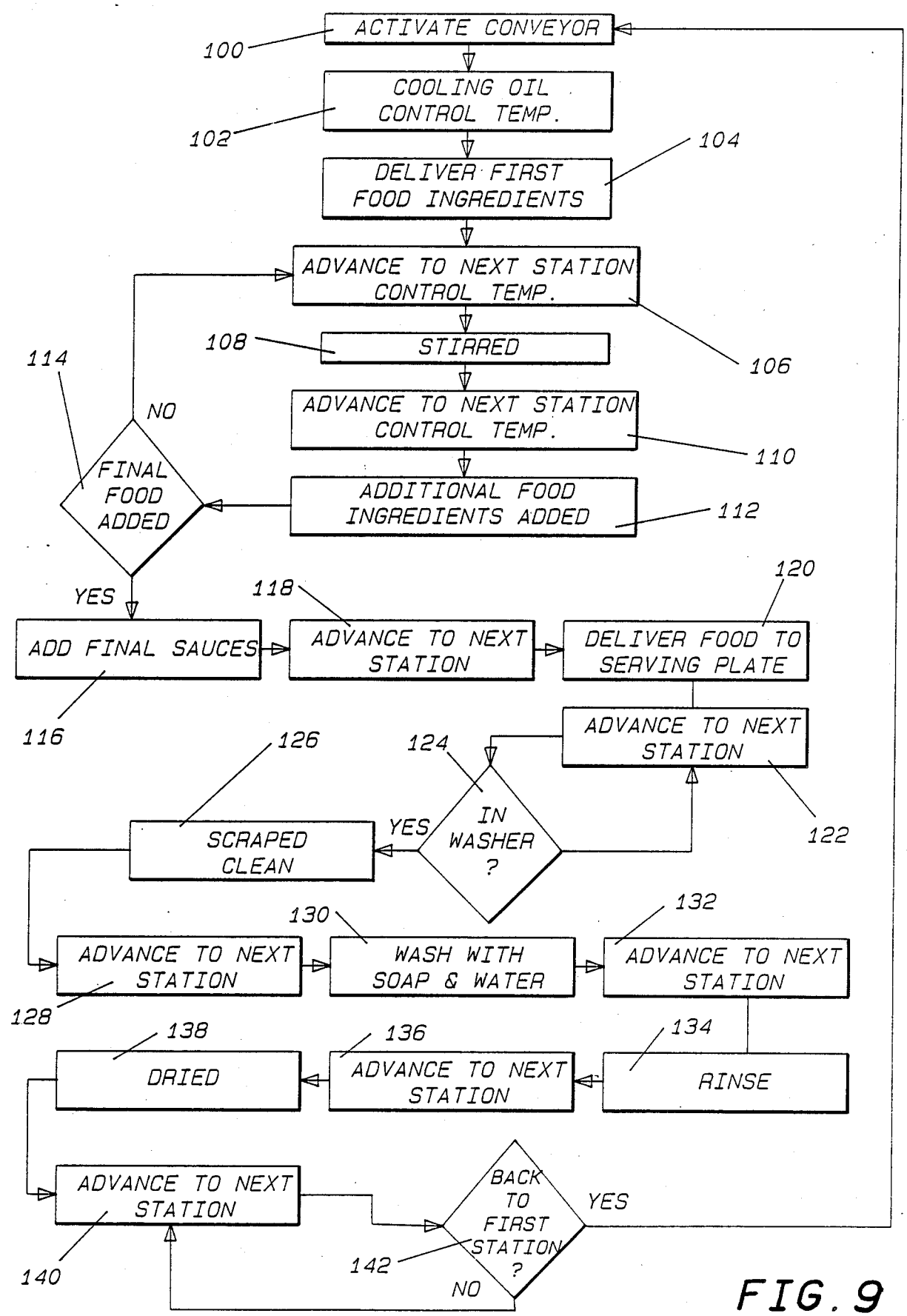
FIG. 9 is a flow diagram depicting the computer controlled methodology of the illustrated embodiment.

Since the various elements of the conveyor system 14 have now been described in detail, consider the timing diagram of FIG. 8 which illustrates the typical timing of the operation of the units at each station. Curve 232 represents the control signal relating to movement of the induction coil at each station. The induction heating is effective only when the induction coil is placed in close proximity to the stainless steel wok. Conveyor belt 16 is maintained in a fixed plane so that the induction coils are raised or lowered as depicted in FIG. 8 to couple and decouple the induction coils to the woks and to allow movement of the woks with conveyor belt 16. At time t1 the induction coil is up or in place against at wok and coupling is possible. However, at time t2 the induction coil begins to move downwardly and clears the bottom of the wok by time t3. The induction coil remains in the lowered position until time t4 and then begins again move to the up position. By time t5 the induction coil is once again in the up position and coupling with the adjacent wok is again possible.

Therefore, curve 234 is representative of the wok advance at a station and can be shown as coordinated with the movement of its corresponding induction coil. For example, the woks remained in position until time t3 until the induction coil is all the way down. At the time t3 the wok advances and continues to advance until the time t4. Thereafter, the induction coil is moved up into place and cooking is commenced.

Similarly, movement of stirrers 44 is depicted by curve 236. The stirrer mechanism moves up and begins to rotate as a whole at time t2. At the same time the induction coil begins to be lowered. Rotation of the stirrer continues from time t2 through time t5 so that the stirring mechanism has rotated 180 degrees between times t2 and t5. At time t5 the stirrer is lowered, thereby placing a clean pair of stirring tools into the wok, which has arrived in place by the preceding time t4.

The activation of the dispenser conveyor or other equivalent mechanism is represented by curve 238. The dispensers at the station are quiescent until time t4 after the wok has been completely positioned. At time t4 the food ingredients are dispensed until time t5 at which time the induction coil is now in place as is the stirring mechanism. Thereafter the dispenser conveyor or other feed mechanism is again quiescent. At time t5 the induction coil, which has been turned off, as depicted by curve 240, is turned on. The wok is rapidly heated as described above and the cooking process commences as does the activation of the stirring tools as represented by curve 242. Stirring thus continues until time t8 which is the beginning time interval of the next cycle and which thus corresponds to time t2 of the cycle just described.

Delivery of the ingredients is depicted by the timing curve 244. Information is communicated to the dispenser station control modules for each dispenser at the station as described in connection with FIG. 6 between times t5 and t6. At time t6 the food ingredients are dispensed until time t7 during which period stirring and cooking continue. Delivery of food ingredients is completed on or before time t7 and the cycle terminates at time t8 and the next cycle begins immediately thereafter.

Because the computer control system is in effect an automated system for producing arbitrarily selected short orders and is computer controlled in each of the process steps, a number of striking advantages arise. First of all, inventory of food items within the dispensing units in conveyor system 14 is continuously monitored. Each of the food dispensers will have a fixed amount of food in each food container when full, typically 15–30 pounds of solid food ingredients, a gallon or half gallon of liquid. As food production progresses, computer 10 will through software control relate the ordering data from the point of said entry with the inventory data pertaining to the food within the dispensers. When one of the dispensers has less than a minimum number of servings left, say five servings, an automatic alarm may be generated and sound at control panel 15 shown in FIG. 5. A light will then be illuminated indicating which station and dispenser needs to be refilled. The food preparation attendant can then take remedial action and input the action taken at control panel 15 thereby allowing the inventory to be updated. In a case when any dispenser has run out of food, computer 10 can immediately hold back the order whose recipe calls for the ingredient until either the dispenser is filled or the customer selects a different menu item. Meanwhile, other food orders which are received at the point of sale can be inserted within the control stream without being backlogged or delayed.

Furthermore, with the ability to track real time use of food inventory, actual histories of food usage and selection for any given installation can be tracked and anticipatory purchase orders made to meet the customer demands to insure that adequate supplies of properly prepared food ingredients are pre-prepared and maintained for dispensing.

In addition to coordinating the processing of food dishes in conveyor system 14, non-automated food preparation steps may also be efficiently coordinated. For example, instructions coordinated with meals being prepared within the automated conveyor system 14 are displayed on the package monitor 13a or deep fry monitor 13b where an attendant can prepare or package the requested food item manually so that it is delivered hot or at the appropriate time and condition for serving with the automatically prepared stir-fried meal. The attendant can remove the order form the package monitor 13a or deep fry monitor 13b by an appropriate input device to confirm timely compliance with the instructions issued by computer 10 according to the meal menu and coordination with other elements of the meal.

Still further, cash receipt, orders, food usage and usage of nonfood items can all be directly or indirectly monitored through the use of histories developed within computer 10 as entered at the point of sale. This information can be stored for later transmittal or transmitted real time to an off-site computer or output device to provide on-site daily summaries or to provide reporting to a distant management or franchiser office for use in business and quality control. Such communications from computer 10 are inexpensively and easily handled through modems and telephonic links and therefore have not been described in greater detail here.

The operation of the circuit architecture as shown in FIG. 5 can be better visualized by considering the functional relationship of the various elements shown in Table 1 below. The point of sale units which include the monitors 13a–13c and keypads 11 are similarly microprocessor driven through appropriate firmware stored within a ROM. The ROM and processor within the point of sale units include interface programs, initializing programs, appropriate system diagnostics relating to the operation of the point of sale device and data communication through conventional RS232 ports to computer 10. The leftmost column of Table 1 outlines the point of sale device. 64KB of RAM are included for ordinary point of sale operations such as storing information which would be required for a display driver to communicate with point of sale CRT's 13c in FIG. 5, a keyboard decoder for communication with key pads 11, and recordal of appropriate transactions relating to the cash drawer and menu selection. Included within point of sale unit 21 is a section of buffer storage which provides a historic recall ability of the day's transactions and recall of any order through a customer identification order which is automatically assigned.

Point of sale unit 21 communicates as suggested in Table 1 with computer 10 whose function is outlined in the second column of the table. Computer 10 provides a monitor display program, a data communication program, a transaction program, an interface interrupt program, a customer order file into which the dispensing stations and their corresponding temperature settings are stored for each customer number and/or dish number, as well as a menu/ingredient file which designates the portions and sizes and the selected dispensers which are to be called up for any given order. Also included within computer 10 is a point of sale initializing file which initializes point of sale unit 21. The programs stored and maintained within computer 10 also include on-line test programs for error conditions and overall system diagnostics such as a identification of station and a dispenser error reset codes along with the temperature error and other error conditions which may be warranted. Still further, computer 10 provides a program for monitoring an input keyboard related to the package monitor 13a or deep fry monitor 13b and point of sale key pads 11. Customer numbers and dish numbers are also tracked and can be communicated through a modem and auto-dial program executed at appropriate times by computer 10. Finally, computer 10 monitors the status of each dispenser for inventory control as described above.

Each of these cooking commands sent to or received by computer 10 are transmitted via a conventional RS232 port as indicated in the fourth column of Table 1 to interface 12 which is outlined by the fifth column in Table 1. Interface 12 is also microprocessor-controlled and includes both firmware memory and RAM memory. Timers, and analog-to-digital, digital-to-analog and actuated drivers and registers as described in connection with FIGS. 6 and 7 are all included within interface 12.

As depicted in the rightmost column in Table 1, interface 12 is then bidirectionally communicated with control panel 15 described above and the dispenser stations wherein electromechanical actuated drivers are controlled, temperature settings and feedbacks are set or sensed, dispenser control functions are reset and monitored, dispenser conveyor functions are advanced, and refrigeration temperatures are monitored as well as DC power. In addition to each of the dispenser stations, each station also includes control signals provides bidirectional communication with the wok mechanism relating to: the position of the induction coil; advancement of the wok; operation of the stirrer; rotation of the stirrer; activation or nonactivation of the serving mechanism to deliver food from the wok into a dish as exemplified by the wok 24g in FIG. 1; advancement of the dish from the dish supply; monitoring of the dish supply within the dish elevator 62; and a number of other error signals. Wok related error signals include: a dish conveyor overrun; a scrubber function signal; a soap spray function; a water system function signal; steam dry system function signal; and monitoring of AC and DC power levels. All these conditions are monitored and are communicated through the RS232 port to the interface unit 12 for processing within computer 10 according to appropriate program control.

The general apparatus of the illustrated embodiments now having been described, consider its method of operation wherein each wok may be provided with an individually specified meal in which the ingredients and cooking cycle are individually varied and tracked through program control so that the apparatus of FIGS. 1-7 produces not a single type of prepared meal but a sequence of selected meals from a short order menu in an arbitrary fashion according to how the orders are received at the point-of-sale computer station 10.

Turn now to the flow diagram of FIG. 8 which depicted one type of program control which could be implemented through computer 10. The flow diagram of FIG. 8 depicts the process to which a single meal would be subjected, each of the meals of the wok in the system having such a program performed in relationship to the meal carried within the wok with appropriate timing.

In step 100 conveyor system 16 is activated to bring a new wok up to the first station. Cooking oil or other food ingredient is dispensed in the wok at station 102 while the wok is at the first station. Meanwhile other ingredients are being metered and gathered together as may be appropriate to the order specified by computer 10 and delivered at step 104 to the wok while in the first station. The wok is advanced to the next station at step 106 and the ingredients are stirred at step 108 by providing appropriate command signals to stirring means 44 while the corresponding temperature of heater 42b is simultaneously controlled. After a selected time, the wok is advanced to a third station at step 110 and the corresponding temperature at the third station is selectively set if needed. Food ingredients are then added from dispenser 46 at step 112. Again after a preselected time period, the wok is then advanced to the next station for additional stirring at a selected temperature which is indicated in the flow diagram of FIG. 8 as looping back to step 106. The step of stirring such as described in connection with step 108 and advancement at step 110 are then executed together with additional food ingredients at step 112. A determination is then made at step 114 of whether the series of advancements between stirring and adding food ingredients is to continue as exemplified by steps 106-112 or whether the final food ingredient, typically a combination of sauces, is to be added. If the latter is the case, the final sauces are added at step 116 wherein the final food ingredients are added and cooked for a preselected time. The food is then delivered to the serving plate at step 118 and any additional scraping or deliver steps are performed to remove the final prepared meal from the wok to the delivery plate 58. The belt is again advanced to the next station at step 122 until as determined at step 124 it is in the washing station. There it is washed with soap and water at step 126, advanced at step 128 and scraped or scoured clean at step 130. It is advanced at step 132 to the next station and rinsed at step 134, advanced again at step 136 and dried at step 138. It continues to be advanced at step 140 as determined by the decision at step 142 until the specified wok is returned to the first conveyor station and the program reentered at step 100.

Many modifications and alterations may be made by those having ordinary skill in the art without departing from the spirit and scope of the invention. For example, although automated short-order preparation of Chinese stir fried foods has been described, it is expressly contemplated that other kinds of foods may be prepared according to the teachings of the present invention.

Still further, specific food dispensing and stirring mechanisms have been shown or described, it is entirely within the scope of the invention that other types of dispensers and stirrers now known or later devised could be included. Furthermore, the illustrated embodiments have shown a sequence of food dispensers and stirrers in alternating array. It is entirely within the scope of the invention that this sequence may be arbitrarily altered so that two or more stirrers or food dispensers may be provided one after each other instead of the alternating sequence which has been described. In addition, a plurality of food dispensers or stirring means may be provided for each station or mixed with each other as in the case at the last station as shown in the illustrated embodiment. For example, the vegetable dispensing station may be provided with the last food dispensing station 46 instead of with the last stirring means 44. Furthermore, each of the operable station has been shown as relatively fixed with respect to their respective stirring stations. It is expressly contemplated that the stirrers and dispensers could be moved between stations, either manually from time to time, or could be incorporated in an automated system utilizing movable tracks so that an appropriate stirring means or food dispenser could be brought to the appropriate station by computer control if desired.

Therefore, the illustrated embodiment should be taken as shown only by way of example and clarity and not as limiting the invention which is defined in the following claims.

I claim:

1. An apparatus for fully automatic cooking of short order meals comprising:
   a plurality of cooking containers;
   a conveyor means for advancing said plurality of cooking containers along a predetermined path;
   heating means for heating said plurality of cooking containers as said cooking containers are advanced along said predetermined path by said conveyor means;
   food dispensing means for selectively dispensing a selected amount of selected food to a selected one of said cooking containers at a selected point on said predetermined path;
   stirring means for stirring food ingredients within selected ones of said cooking containers at selected points on said predetermined path; and
   computer control means coupled to said conveyor means, heating means, food dispensing means and stirring means for controlling operation of each of said means according to an arbitrarily selected customer order selectively assigned to each one of said cooking containers as said cooking container is advanced along said predetermined path,
   whereby cooked meals are automatically prepared according to a short order selection entered through said computer control means.

2. The apparatus of claim 1 wherein said cooking containers are woks.

3. The apparatus of claim 1 wherein said food dispensing means comprises spice/condiment dispensing means for selectively providing at least one spice/condiment among a plurality of spice/condiments and a food ingredient means for selectively providing at least one type of food ingredient.

4. The apparatus of claim 2 wherein said food dispensing means comprises spice/condiment dispensing means for selectively providing at least one spice/condiment among a plurality of spice/condiments and a food ingredient means for selectively providing at least one type of food ingredient.

5. The apparatus of claim 1 wherein said computer control means comprises a point-of-sale entry means for entering an arbitrarily selected customer order, computer means for generating a sequence of timed control signals corresponding to each said arbitrarily selected customer orders, and interface means for generating drive signals for said conveyor means, heating means, food dispensing means, and stirring means to execute said sequence of timed control signals corresponding to said arbitrarily selected customer order.

6. The apparatus of claim 2 wherein said computer control means comprises a point-of-sale entry means for entering an arbitrarily selected customer order, computer means for generating a sequence of timed control signals corresponding to each said arbitrarily selected customer orders, and interface means for generating drive signals for said conveyor means, heating means, food dispensing means, and stirring means to execute said sequence of timed control signals corresponding to said arbitrarily selected customer order.

7. The apparatus of claim 4 wherein said computer control means comprises a point-of-sale entry means for entering an arbitrarily selected customer order, computer means for generating a sequence of timed control signals corresponding to each said arbitrarily selected customer orders, and interface means for generating drive signals for said conveyor means, heating means, food dispensing means, and stirring means to execute said sequence of timed control signals corresponding to said arbitrarily selected customer order.

8. The apparatus of claim 1 wherein said heating means comprises a plurality of separate heating elements, each element being separately controlled by said computer control means to provide a selected degree of heat for a corresponding selective period of time.

9. The apparatus of claim 7 wherein said heating means comprises a plurality of separate heating elements, each element being separately controlled by said computer control means to provide a selective degree of heat for a corresponding selective period of time.

10. The apparatus of claim 1 further comprising means for removing said food ingredients from each of said plurality of cooking containers after said corresponding food ingredients have been completely prepared to deliver said food ingredients for consumption; and
    cleaning means for cleaning each of said plurality of cooking containers after said food ingredients have been removed from each corresponding cooking container.

11. The apparatus of claim 2 further comprising means for removing said food ingredients from each of said plurality of cooking containers after said corresponding food ingredients have been completely prepared to deliver said food ingredients for consumption; and
    cleaning means for cleaning each of said plurality of cooking containers after said food ingredients have been removed from each corresponding cooking container.

12. The apparatus of claim 3 further comprising means for removing said food ingredients from each of said plurality of cooking containers after said corresponding food ingredients have been completely prepared to deliver said food ingredients for consumption; and cleaning means for cleaning each of said plurality of cooking containers after said food ingredients have been removed from each corresponding cooking container.

13. The apparatus of claim 9 further comprising means for removing said food ingredients from each of said plurality of cooking containers after said corresponding food ingredients have been completely prepared to deliver said food ingredients for consumption; and cleaning means for cleaning each of said plurality of cooking containers after said food ingredients have been removed from each corresponding cooking container.

14. The apparatus of claim 10 wherein said cleaning means comprises washing means for washing each said cooking container with a washing solution, scouring means for scouring each cooking container, rinsing means for rinsing each cooking container, and drying means for drying each cooking container as said plurality of cooking containers are advanced along said predetermined path.

15. A method for automatically preparing arbitrarily selected, short order meals comprising the steps of:

selectively disposing food ingredients into a cooking container according to arbitrary customer selection, said food ingredients being disposed into said cooking container by a food dispensing means controlled by a computer control means into which said customer selection is entered;

advancing said selected food ingredients in said cooking container on a conveyor system through a plurality of subsequent cooking stations;

selectively disposing additional food ingredients into said container at preselected ones of said plurality of cooking stations;

selectively stirring food ingredients in said cooking container at selected ones of said cooking stations according to said customer order entry as controlled by said computer controlled means;

selectively controlling heating and timing of said food ingredients within said cooking container at each of said plurality of cooking stations; and removing said food ingredients from said cooking container when said ingredients are completely prepared according to said arbitrarily entered customer order, whereby short orders originated by customers are prepared in a fully automated method.

16. The method of claim 15 further comprising performing said steps of selectively advancing said food container, selectively disposing food ingredients therein, selectively manipulating said food ingredients therein, selectively heating said food ingredients therein and delivering said food ingredients in a plurality of cooking containers, each of said cooking containers being advanced on a conveyor system among said plurality of cooking stations, said steps being simultaneously performed in corresponding order to the position of said cooking container within said plurality of cooking stations according to the significance attached to each cooking station by said customer entered short order.

17. The method of claim 15 further comprising the steps of cleaning said cooking container and returning said cooking container for reuse for a subsequent customer short order.

18. The method of claim 16 further comprising the steps of cleaning said plurality of cooking containers at predetermined stations within said conveyor path and returning each of said cleaned cooking containers in sequence for reuse in a plurality of subsequent customer short order entries.

* * * * *